Dec. 6, 1927.

H. L. JOHNSTON

TRANSMISSION MECHANISM

Filed Feb. 9, 1926

1,651,822

INVENTOR.
Herbert L. Johnston
BY
ATTORNEYS.

Patented Dec. 6, 1927.

1,651,822

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

TRANSMISSION MECHANISM.

Application filed February 9, 1926. Serial No. 87,179.

My invention relates to transmission mechanism and particularly to transmission mechanism embodying flexible connections and a clutch between a revolving driving member and speed change gearing adapted to actuate driven members.

It is the object of my invention to provide a connection between a driving member and speed change gearing, which connection will bear the shocks incident to intervals of changing gears without causing undue strain on the transmission mechanism. It is further my object to provide in combination with the flexible connection for a clutching device between the driving member and the driven member, which will greatly reduce the likelihood of damage to the mechanism by sudden stoppages such as often occur in mixing machines and the like.

Referring to the drawing in which I have illustrated a preferred construction embodying my invention:—

Figure 2:
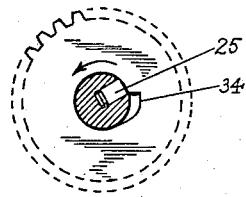
Figure 2 is a side elevation showing an internally grooved speed change gear with a diving key in inoperative position.

Generally indicated at 1 I have shown a casing in which my transmission mechanism may be suitably encased. The pinion 2 which may be mounted on the end of a motor shaft, or on any other driving mechanism, engages and drives a gear 3, which is non-rotatively mounted on a short shaft 4. The lower end of the shaft is slotted as indicated at 5, the slot being of suitable size and shape to engage the end of a spring 6. The particular shape of the spring member which I have found most effective is as indicated in which the spring consists of a flat metallic plate which may be twisted along an axial line extending longitudinally therethrough. A hollow cylindrical member 7 surrounds the spring and provides a journal for the end of the shaft 4. The member 7 has an enlarged end 8 which forms the internal portion of a clutch device which will be hereinafter described. The end of the member 7 adjacent the gear 3 is provided with a slot 9 in which a pin 10 extending from the shaft 4 is mounted. The spring is so mounted that in a construction according to the one illustrated in which the direction of rotation of the gear 3 is clockwise, the normal position of the pin within the slot 9 will be at the right end of the slot. The enlarged end of the member 7 has a plug 11 within its hollow interior and the plug may be fixedly mounted with relation to the enlarged end of the member 7 by means of a pin 12. The plug preferably operates as if it were an integral part of the member 7, and might be, except that I have found that the structure may be more easily assembled as has been described. A series of radial holes 13 are drilled axially through the enlarged end 8 and within the holes I have disposed hardened steel balls 14, with springs 15 abutting the plug 11 tensioned to press the balls outwardly through the ends of the radial holes 13.

The lower end 8 of the member 7 is mounted within a cup shaped member 16 which has a hub 17 extending from one end thereof. The hub has mounted within it the shaft 18. Interspaced holes 19 corresponding with the holes 13 in the member 8 are drilled radially into the cup shaped member 16 and I have found it preferable to drill these holes of slightly less diameter, than the diameter of the balls 14. Arcuate grooves within the inner walls of the cup shaped member will provide as effective a means of engaging the balls 14 but I have found that the drilling of the holes permits a much simpler manufacturing operation.

Figure 3:
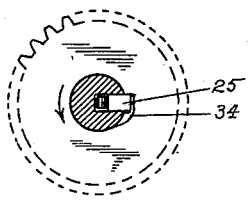
Figure 3 is a side elevation showing the internally grooved speed change gear illustrated in Figure 2 with the diving key in operative position.
Figure 4:
Figure 4 is a perspective view of the preferred type of spring by means of which a flexible connection is provided.
Figure 1:
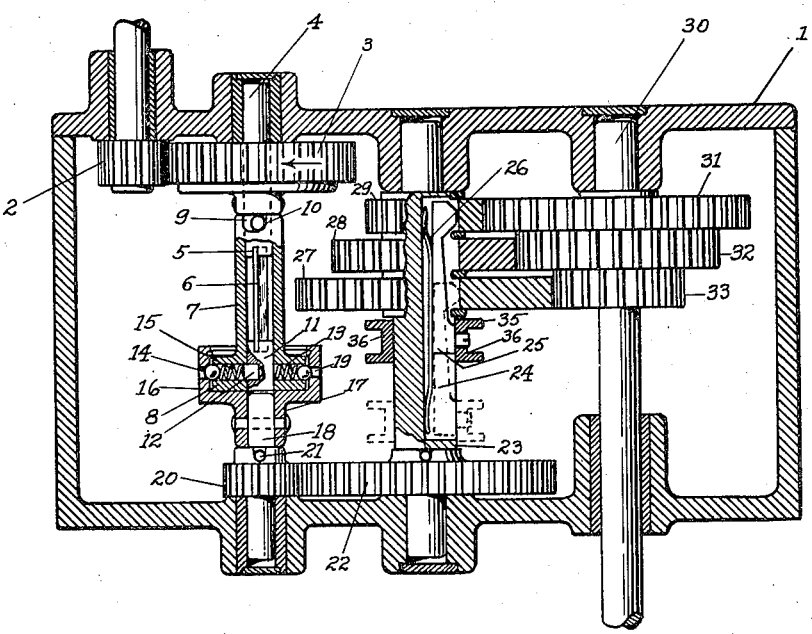
Figure 1 is a sectional view of the transmission mechanism.

Upon the shaft 18 a pinion 20 is fixedly mounted, the preferred securing means being, as indicated, a pin slot connection 21. The pinion 20 engages a gear 22 mounted on a shaft 23 which carries the speed change gears. The shaft 23 has milled longitudinally therein a keyway 24 within which is mounted a diving key 25. Within the keyway 24 and tensioned to press the key outwardly I have provided a spring 26. Mounted rotatably on the shaft 23 there are disposed suitable speed change gears such as the gears indicated at 27, 28 and 29. A driven shaft 30 has cooperating gears 31, 32 and 33 fixedly mounted thereon which gears are meshed with the gears 29, 28 and 27 respectively. In the particular mechanism illustrated the final load is carried by the portion of the shaft 30 which is shown extending from the casing 1. Each of the gears 27, 28 and 29 has a groove 34, which is preferably tapered counter to the direction of engagement with the key 25 as indicated in Figures 2 and 3. The key is movably on the shaft 23 so that the end may be moved into engagement with the groove in any one of the gears. The other end of the key is mounted in a sliding sleeve 35, which has a peripheral groove 36 therein in which a fork or other suitable lever may be secured to shift from one set of gears to another.

The flexible connection between the driving gear 3 and the member 7 will be readily understood. The shaft 4 is usually rotated at a fixed speed so that it will be apparent that if there were no flexible connections between the driving and the driven members with the movement of the key from engaging position with one of the gears to another there would be an interval when the shaft 30 would be stationary. Then with the engagement of the gear there would be an abrupt jerk which might injure the mechanism. With the flexible connection, however, which I have provided, during intervals of change of gears, with the engagement of any gear the spring 6 will flex until the pin 10 has moved to the left end of the slot 9. The normal operating position of the pin 10 is at the right end of the slot 9, but as soon as there is any abrupt shock as occurs at intervals of changing gears, the pin will move to the left end of the slot and the spring will be flexed. Should there be a jamming of the driven members the clutch device formed by the balls engaging the holes in the cup shaped member will permit the members 7 and 8 to rotate with relation to the cup shaped member until the cause of the stoppage has been corrected. During such intervals of rotation of the members 7 and 8 with relation to the cup shaped member the balls will slide along the inner wall of the cup shaped member and as soon as the cause of stoppage is corrected the balls will again seat in the holes 19.

My mechanism provides a flexible connection which will allow for abrupt jerks caused by the changing of gears without damage and at the same time provision is made in combination with this flexible connection for permitting a complete stoppage of the driven members. In addition to disclosing mechanism with which these purposes may be accomplished I have disclosed a specific structure which is inexpensive to manufacture and which gives excellent results.

While I have in the ensuing description disclosed one specific embodiment of my invention, it will be understood that its application is not limited to speed change gears but will provide a suitable transmission for any alternately engaged and disengaged driven members.

Having thus described my invention, what I claim as new and desire to secure by Letters Patent, is:—

1. Transmission mechanism comprising in combination with a driving member and a driven member adapted to be rotatably engaged during the operation of the driving member, intermediate mechanism consisting of a torsion spring secured at one end to a driving member and at the other to a driven member with means of limiting the torque of said spring and establishing a non-flexible driving connection at a point of extreme torque of said spring, and said spring consisting of at least one flat metallic plate having an axis of torque along a line extending longitudinally therethrough.

2. Transmission mechanism comprising in combination with a driving shaft having a pin projecting therefrom, a flat plate secured to said shaft, said plate having an axis of torque along a line extending longitudinally therethrough, a hub member having an elongated sleeve portion surrounding and acting as a bearing for said shaft, said hub member having a series of radial holes with balls resiliently pressed outwardly within the holes, a housing enclosing said hub having a series of holes therein in alignment with the path of movement of the balls during the rotation of said hub, an attaching structure by means of which said housing is connected with a shaft to be driven, and said elongated sleeve portion having a slot within which the pin of the driving shaft is retained.

3. Transmission mechanism comprising in combination with a driving shaft and a shaft to be driven, a hub having an elongated sleeve portion providing a bearing for said driving shaft, a longitudinally twistable metallic plate enclosed within said sleeve, a driving portion of an overload clutch connected by said plate with the driving shaft and a pin and slot connection between said shaft and sleeve.

HERBERT L. JOHNSTON.